(12) United States Patent
Ponnusamy et al.

(10) Patent No.: US 11,501,223 B2
(45) Date of Patent: *Nov. 15, 2022

(54) METHOD AND SYSTEM FOR DETERMINING STATES OF TASKS BASED ON ACTIVITIES ASSOCIATED WITH THE TASKS OVER A PREDETERMINED PERIOD OF TIME

(71) Applicant: Clari Inc., Sunnyvale, CA (US)

(72) Inventors: Rajkumar Ponnusamy, Sunnyvale, CA (US); David Bao, Sunnyvale, CA (US)

(73) Assignee: CLARI INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/546,817

(22) Filed: Dec. 9, 2021

(65) Prior Publication Data

US 2022/0222109 A1    Jul. 14, 2022

Related U.S. Application Data

(63) Continuation of application No. 15/679,018, filed on Aug. 16, 2017.

(51) Int. Cl.
| | |
|---|---|
| *G06Q 10/06* | (2012.01) |
| *G06F 16/20* | (2019.01) |
| *G06F 16/335* | (2019.01) |
| *G06F 9/48* | (2006.01) |
| *G06F 9/54* | (2006.01) |
| *H04L 51/04* | (2022.01) |

(52) U.S. Cl.
CPC ... *G06Q 10/063114* (2013.01); *G06F 9/4881* (2013.01); *G06F 9/546* (2013.01); *G06F 16/20* (2019.01); *G06F 16/335* (2019.01); *G06Q 10/06313* (2013.01); *H04L 51/04* (2013.01)

(58) Field of Classification Search
CPC ...... G06Q 10/063114; G06Q 10/06313; G06F 16/20; G06F 16/335
See application file for complete search history.

(56) References Cited

U.S. PATENT DOCUMENTS

| | | |
|---|---|---|
| 6,578,005 B1 | 6/2003 | Lesaint et al. |
| 7,480,623 B1 | 1/2009 | Landvater |
| | (Continued) | |

FOREIGN PATENT DOCUMENTS

WO    2002010961 A2    2/2002

*Primary Examiner* — Charles E Anya
(74) *Attorney, Agent, or Firm* — Womble Bond Dickinson (US) LLP

(57) ABSTRACT

For a given user, a task database system associated with the user is queried to identify a list of tasks associated with the user. For each of the tasks, an email system associated with the user is queried to obtain one or more emails and calendar events associated with the task. An IM system associated with the user is queried to obtain IM messages of an IM channel of which the user is a member. The IM channel has been specifically created to exchange messages concerning the task amongst the members of the IM channel. The task is then determined whether it satisfies a predetermined state (e.g., inactive, lack of future meetings) in view of emails, calendar events, and IM messages associated with the task based on a set of rules. If the task is determined to satisfy the predetermined state, a notification message is transmitted to a preconfigured destination.

20 Claims, 10 Drawing Sheets

(56) References Cited

U.S. PATENT DOCUMENTS

| | | |
|---|---|---|
| 7,519,173 B2 | 4/2009 | Flores et al. |
| 7,881,957 B1 | 2/2011 | Cohen et al. |
| 8,005,700 B2 | 8/2011 | Amitabh et al. |
| 9,239,719 B1 | 1/2016 | Feinstein et al. |
| 9,298,355 B1 | 3/2016 | Beausoleil et al. |
| 2002/0165739 A1 | 11/2002 | Guyan et al. |
| 2003/0068097 A1 | 4/2003 | Wilson et al. |
| 2004/0015556 A1 | 1/2004 | Chopra |
| 2004/0030992 A1 | 2/2004 | Moisa et al. |
| 2005/0038687 A1 | 2/2005 | Galdes |
| 2005/0063365 A1 | 3/2005 | Mathew et al. |
| 2005/0114829 A1 | 5/2005 | Robin et al. |
| 2005/0209901 A1 | 9/2005 | Miller et al. |
| 2006/0085220 A1 | 4/2006 | Frank et al. |
| 2007/0094661 A1 | 4/2007 | Baird et al. |
| 2007/0192155 A1 | 8/2007 | Gauger |
| 2007/0192162 A1 | 8/2007 | Simons et al. |
| 2007/0250377 A1 | 10/2007 | Hill et al. |
| 2007/0258576 A1* | 11/2007 | Klein ............... H04M 3/5232 705/1.1 |
| 2007/0282658 A1 | 12/2007 | Brintle |
| 2008/0049022 A1 | 2/2008 | Sherb et al. |
| 2008/0209417 A1 | 8/2008 | Jakobson |
| 2008/0250377 A1 | 10/2008 | Bird et al. |
| 2008/0288322 A1* | 11/2008 | Kennedy ............ G06Q 10/06 705/7.17 |
| 2008/0301296 A1 | 12/2008 | York |
| 2009/0106691 A1 | 4/2009 | Ballard et al. |
| 2009/0138301 A1 | 5/2009 | Wan |
| 2009/0216571 A1 | 8/2009 | Sunshine et al. |
| 2009/0234686 A1 | 9/2009 | Chakra et al. |
| 2009/0287532 A1 | 11/2009 | Cohen et al. |
| 2009/0287730 A1* | 11/2009 | Motoyama ......... G06Q 10/109 707/999.102 |
| 2009/0313121 A1 | 12/2009 | Post et al. |
| 2010/0057628 A1 | 3/2010 | Trinidad et al. |
| 2010/0313009 A1 | 12/2010 | Combet et al. |
| 2011/0010340 A1 | 1/2011 | Hung et al. |
| 2011/0029622 A1 | 2/2011 | Walker et al. |
| 2011/0071893 A1* | 3/2011 | Malhotra ........... G06Q 10/109 709/225 |
| 2011/0078260 A1 | 3/2011 | Rashad et al. |
| 2011/0154338 A1 | 6/2011 | Ramanathaiah et al. |
| 2011/0225010 A1* | 9/2011 | Andrews ............ G16H 10/60 705/3 |
| 2011/0264483 A1 | 10/2011 | Nezhad et al. |
| 2012/0042003 A1 | 2/2012 | Goetz et al. |
| 2012/0046996 A1 | 2/2012 | Shah et al. |
| 2012/0150888 A1 | 6/2012 | Hyatt et al. |
| 2012/0173638 A1 | 7/2012 | Vymenets et al. |
| 2012/0246027 A1 | 9/2012 | Martin |
| 2012/0278117 A1 | 11/2012 | Nguyen et al. |
| 2013/0006986 A1* | 1/2013 | Phan ................ G06Q 10/101 707/E17.046 |
| 2013/0080201 A1 | 3/2013 | Miller |
| 2013/0212583 A1* | 8/2013 | Gordon ............. G06Q 10/00 718/100 |
| 2013/0218640 A1 | 8/2013 | Kidder et al. |
| 2013/0246119 A1 | 9/2013 | Slaughenhoupt |
| 2013/0318533 A1 | 11/2013 | Aghassipour et al. |
| 2013/0318589 A1 | 11/2013 | Ford et al. |
| 2014/0012616 A1 | 1/2014 | Moshenek |
| 2014/0081685 A1* | 3/2014 | Thacker ............ G06F 16/2379 705/7.12 |
| 2014/0129624 A1 | 5/2014 | Liu et al. |
| 2014/0156757 A1 | 6/2014 | Zhang et al. |
| 2014/0244351 A1 | 8/2014 | Symons |
| 2014/0304034 A1 | 10/2014 | Mitchell et al. |
| 2015/0051957 A1 | 2/2015 | Griebeler et al. |
| 2015/0121299 A1 | 4/2015 | Snyder et al. |
| 2015/0153571 A1 | 6/2015 | Ballard et al. |
| 2015/0178666 A1 | 6/2015 | Green et al. |
| 2015/0339628 A1 | 11/2015 | Oh et al. |
| 2015/0348589 A1 | 12/2015 | Barisano, III et al. |
| 2016/0150280 A1 | 5/2016 | Cui et al. |
| 2016/0155137 A1 | 6/2016 | Harsha et al. |
| 2016/0180279 A1* | 6/2016 | Koerner ......... G06Q 10/063114 705/7.15 |
| 2016/0224939 A1 | 8/2016 | Chen et al. |
| 2016/0253706 A1 | 9/2016 | Kursar |
| 2016/0335896 A1 | 11/2016 | Iwamoto |
| 2017/0083572 A1 | 3/2017 | Tankersley et al. |
| 2017/0102912 A1 | 4/2017 | Jambulingam et al. |
| 2017/0193349 A1 | 7/2017 | Jothilingam et al. |
| 2017/0272394 A1 | 9/2017 | Ding et al. |
| 2017/0286978 A1 | 10/2017 | Govindarajan et al. |
| 2018/0005171 A1 | 1/2018 | Harsha et al. |
| 2018/0005253 A1 | 1/2018 | Megahed et al. |
| 2018/0315062 A1 | 11/2018 | Parekh et al. |

\* cited by examiner

| User ID | IM | Email | Task DB System |
|---------|-----|-------|----------------|
| User 1  |     |       |                |
| User 2  |     |       |                |
| ⋮       | ⋮   | ⋮     | ⋮              |

METHOD AND SYSTEM FOR DETERMINING STATES OF TASKS BASED ON ACTIVITIES ASSOCIATED WITH THE TASKS OVER A PREDETERMINED PERIOD OF TIME

This is a continuation application of U.S. patent application Ser. No. 15/679,018, filed Aug. 16, 2017, which is incorporated by reference in its entirety.

FIELD OF THE INVENTION

Embodiments of the present invention relate generally to task management. More particularly, embodiments of the invention relate to categorizing and determining states of tasks based on activities of the tasks over a period of time.

BACKGROUND

A project manager managing a team of team members is constantly striving to be aware of the progress in each of the projects managed by his team to be able to guide to work effectively and efficiently. Today, it is a struggle for a manager to find the information most relevant and find the projects that require attentions or actions. Project managers are too often working on multiple projects concurrently and can lose sight of the progress in some of them.

Although project specific communication platforms such as instant messaging exist, none of them tackle the problem of automatically delivering insights to the users at the right moments to take actions. This results in the instant messaging (IM) tools not being widely used to improve communications of the project development.

BRIEF DESCRIPTION OF THE DRAWINGS

Embodiments of the invention are illustrated by way of example and not limited to the figures of the accompanying drawings in which like references indicate similar elements.

FIG. 4 is a block diagram illustrating an example of a data structure representing a user database according to one embodiment.

DETAILED DESCRIPTION

Figure 1A:
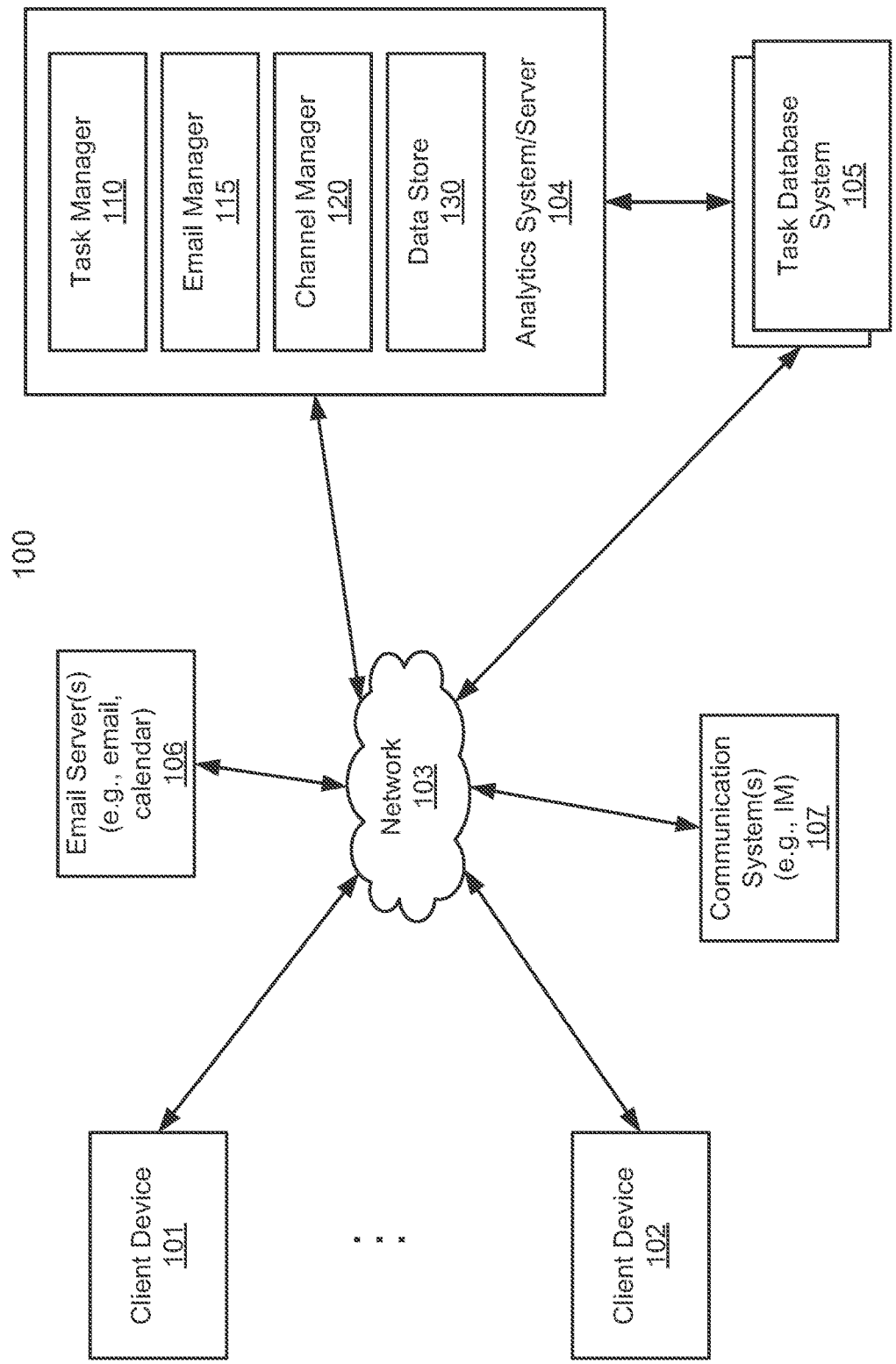
FIGS. 1A and 1B are block diagrams illustrating a network configuration according to certain embodiments of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a project management platform is utilized to automatically generate and deliver insightful messages to the users who are most interested in the status or state of tasks to take further actions. By doing so, project managers and their team members can be alerted about the status of the projects early. The direct integration of such insights into an IM platform instantly allows users to take direct actions on those tasks. A significant technical advantage is to tap into multiple different sources of information (e.g., an email system, calendar system, IM system, task database system), to find the most relevant insights of the tasks to share amongst the relevant people, and to leverage a high-engagement platform as a vehicle for delivering the insights. The system is able to automatically detect characteristics of each task being worked on and to detect abnormal status or state of the task early based on the information obtained from different sources. As a result, an action can be taken to ensure the task is on track to be completed before it is too late.

According to one embodiment, for a given user, a task database system associated with the user is queried to identify a list of one or more tasks that are associated with the user (e.g., an owner of the task, a manager of a user who is an owner of the task). For each of the tasks associated with the user, an email system associated with the user is queried to obtain one or more emails and calendar events associated with the task. An IM system associated with the user is queried to obtain IM messages of an IM channel of which the user is a member. The IM channel has been specifically created to exchange messages concerning the task amongst the members of the IM channel. The task is then determined whether it satisfies a predetermined condition or state (e.g., at risk of failure to complete, finish, or close) in view of emails, calendar events, and IM messages associated with the task based on a set of state determination rules. If the task is determined to satisfy the predetermined state, a notification message is transmitted to a preconfigured destination (e.g., task owner, manager of task owner or team members).

In one embodiment, based on the emails, calendar event, and IM messages, it is determined whether a period of time (e.g., number of days) since the last time the task was updated is greater than a first predetermined threshold. It is further determined whether a period of time since the last message was posted in an IM channel of the task is greater than a second predetermined threshold. It is further determined whether the task expects to be completed within a predetermined period of time (e.g., current fiscal quarter or year). It is further determined whether a period of time since the last time the task was determined satisfying the predetermined state is greater than a third predetermined threshold. It is further determined whether the IM channel associated with the task includes a member other than an owner of the task. If any one or more of the above conditions are met, the task may be considered or categorized as satisfying a predetermined condition or a predetermined state, for example, as an inactive task, which may be at risk of failure to complete. As a result, an action may be taken. In one embodiment, a task reaches a predetermined state or condition (e.g., inactive project) if all of the above conditions are met.

In another embodiment, based on the emails, calendar event, and IM messages, it is determined whether there was a meeting associated with the task conducted in a past predetermined period of time. It is further determined whether a period of time since the last meeting of the task was conducted exceeds a first predetermined threshold. It is further determined whether there is no meeting scheduled in a future predetermined period of time. It is further determined whether a period of time since the last time the project satisfied the predetermined state is greater than a second predetermined threshold. If any one or more of the above conditions are met, the task may be considered or categorized as satisfying a predetermined condition, for example, as lack of future meetings, which may be at risk of failure to complete. As a result, a meeting may be scheduled to follow up. In one embodiment, a task reaches a predetermined state or condition (e.g., lack of future meetings) if all of the above conditions are met.

Note that throughout this application, a project is utilized as an example of a task performed by a user of a group of users. A task manager can also be referred to as a project manager, and the terms of "task manager" and "project manager" are interchangeable terms for illustration purpose throughout the entire application. Similarly, a customer relationship management or CRM system is utilized as an example of a task database system, and the terms of "task database system" and "CRM system" are interchangeable terms for illustration purpose throughout the entire application.

FIG. 1A is a block diagram illustrating a network configuration according to one embodiment of the invention. Referring to FIG. 1A, system 100 includes, but is not limited to, one or more client systems 101-102 communicatively coupled to servers 104-105 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Network 103 may be any type of networks such as a local area network (LAN), a wide area network (WAN) such as the Internet, or a combination thereof, wired or wireless. Servers 104-105 can be any kinds of servers or a cluster of servers, such as, for example, Web servers, application servers, cloud servers, backend servers, etc.

Task database system/server 105 provides task data services to a variety of clients, which may be periodically or constantly accessed and updated by the clients for managing their task management data or other project management data. An example of task database system 105 is a CRM system that provides CRM data services. Task or CRM data includes any kinds of customer relationship management data, such as, for example, projects, tasks, deals, contracts, etc. The CRM services may be provided by a variety of CRM vendors, such as, for example Salesforce.com, SAP AG, Oracle, and Microsoft. CRM is a term that refers to practices, strategies and technologies that companies use to manage and analyze customer interactions and data throughout the customer lifecycle, with the goal of improving business relationships with customers, assisting in customer retention and driving sales growth. CRM systems are designed to compile information on customers across different channels or points of contact between the customer and the company, which could include the company's website, telephone, live chat, direct mail, marketing materials and social media.

In one embodiment, data analytics system or sever 104 (also referred to as a project management system or server) provides task/project management and/or data analytics services to clients 101-102 based on CRM data provided by CRM system 105 as a data source. Note that although there is only one CRM system shown, multiple CRM systems may also be implemented, where project management system 104 may be implemented as a multi-tenancy system that can access multiple CRM systems concurrently over network 103. For example, a user of client device 101 may be associated with a first organization as a first corporate client to project management system 104, while a user of client device 102 may be associated with a second organization as a second corporate client to project management system 104. The first and second organizations may employ different ones of CRM systems 105. Also note that a CRM system is utilized as an example of data sources, however, other types of data sources or systems can also be applied.

In one embodiment, project management system 104 includes, but it is not limited to, task manager 110 (also referred to as a project manager), email manager 115, channel manager 120, and data store 130. The project management system 104 may further include a user interface (not shown), which can be any kind of user interface (e.g., Web, graphical user interface or GUI, or command line interface or CLI) that allows users of client devices 101-102 to access the services provided by project management system 104. In one embodiment, such a service may include automatically identifying a project that satisfies a predetermined condition (e.g., inactive, lack of future meetings), which may require an attention or action to follow through. Such a project may be identified based on information obtained from a variety of data sources, such as, for example, emails, calendar events, IM messages, and CRM systems. A project can be any kind of projects such as a sales project (also referred to as an opportunity).

Data store 130 stores or caches CRM data of a variety of projects, which may be periodically updated from the corresponding data source(s) or data provider(s), in this example, CRM system(s) 105. Alternatively, task manager 110 and/or channel manager 120 may directly access CRM system(s) 105 to query and retrieve the CRM data. Data stored in data store 130 can be maintained in a variety of data structures, such as tables or databases. Task manager 110 and/or channel manager 120 can access data store 130 via a variety of application programming interfaces (APIs), database queries, or other suitable communication protocols (e.g., structured query language or SQL).

According to one embodiment, task manager 110 is configured to communicate and interact with task database system 105 (e.g., a customer relationship management or CRM system) to obtain task information of tasks maintained in task database system 105. Task manager 110 can communicate with task database system 105 via an application programming interface (API) and/or using a communication protocol. For a given user, task manager 110 can communicate with task database system 105 to retrieve a list of tasks that are associated with the user. A user can be an owner of a task, a team member of a team managing the task, or a manager of owners or teams of tasks. For a given task, task manager 110 can also obtain properties or attributes of the task from task database system 105 as a part of task information. Task manager 110 is configured to communicate with task database system(s) 105 using a variety of APIs or protocols compatible with task database system(s) 105.

In one embodiment, for a given project associated with a user, email manager 115 is configured to communicate with email system 106 to identify and obtain a list of emails and/or calendar events associated with the user and the project. Email manager 115 can search via an API based on a user ID of the user (e.g., an email address associated with a sender or recipient of emails, a participant of meetings) and project keywords (e.g., subject or title field) of the project to identify the relevant emails and calendar events.

In one embodiment, for each of the projects maintained in CRM system 105, an IM channel (e.g., IM group chat) is created to allow users associated with the project to exchange messages concerning development of the project with each other. Channel manager 120 is configured to communicate with IM system 107 via an API to retrieve IM messages of a particular IM channel of a particular project. Channel manager 120 can further derive IM channel statistics of the IM channel based on the IM messages obtained from IM system 107.

Project manager 110, email manager 115, and channel manager 120 are tapping into multiple different sources (e.g., CRM systems 105, email servers 106, and communication systems 107) of information to find the most relevant projects that need an attention or action from the user or other people. In one embodiment, based on the project information, email and calendar information, and IM channel information, it can be determined whether a particular project satisfies a predetermined condition, such as, for example, whether the project is at risk of failure to complete. For example, based on the information obtained from CRM system 105, email server 106, and IM server 107, a risk detector (not shown) can detect that a project is inactive or lacks of future meetings. As a result, an action should be taken or an attention should be brought to someone before it is too late. By automatically scanning CRM system 105, email system 106, and IM system 107, the projects at risk can be automatically identified and a remedial action can be performed in time.

Figure 1B:
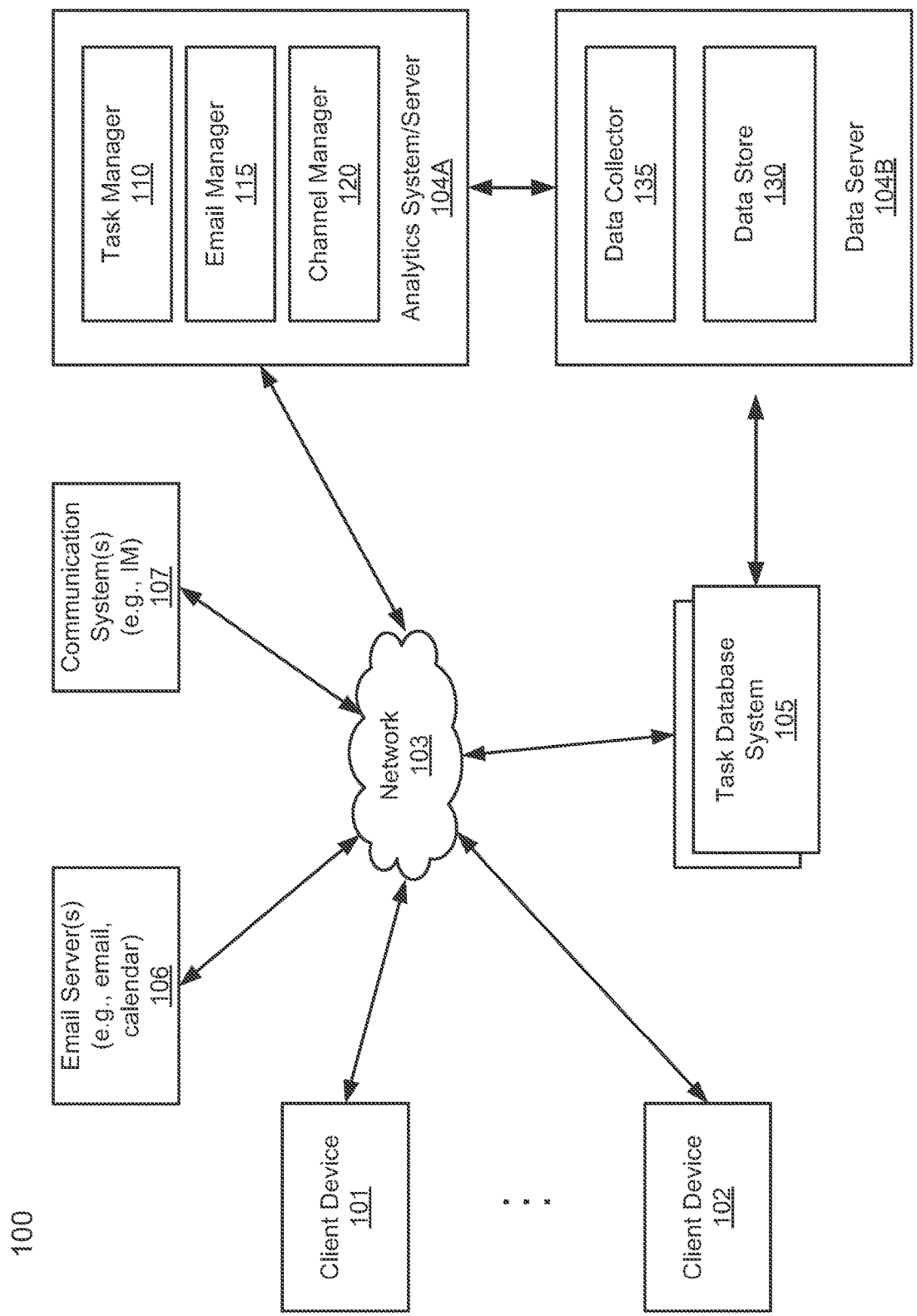

Although in this embodiment, data store 130 is maintained by project management system 104, however, data store 130 can be maintained in a dedicated data server that is a separate server from project management server 104 as shown in FIG. 1B. Referring now to FIG. 1B, in this embodiment, project management server 104A and data server 104B are implemented as separate servers, which may be operated by the same or different organizations or entities. Data store 130 is now maintained by data server 104B. Data server 104B further includes data collector 135 configured to periodically or constantly collect or update CRM data from data sources 105. Project management server 104A communicates with data server 104B using a variety of communication protocols to access task data stored in data store 130.

Figure 2:
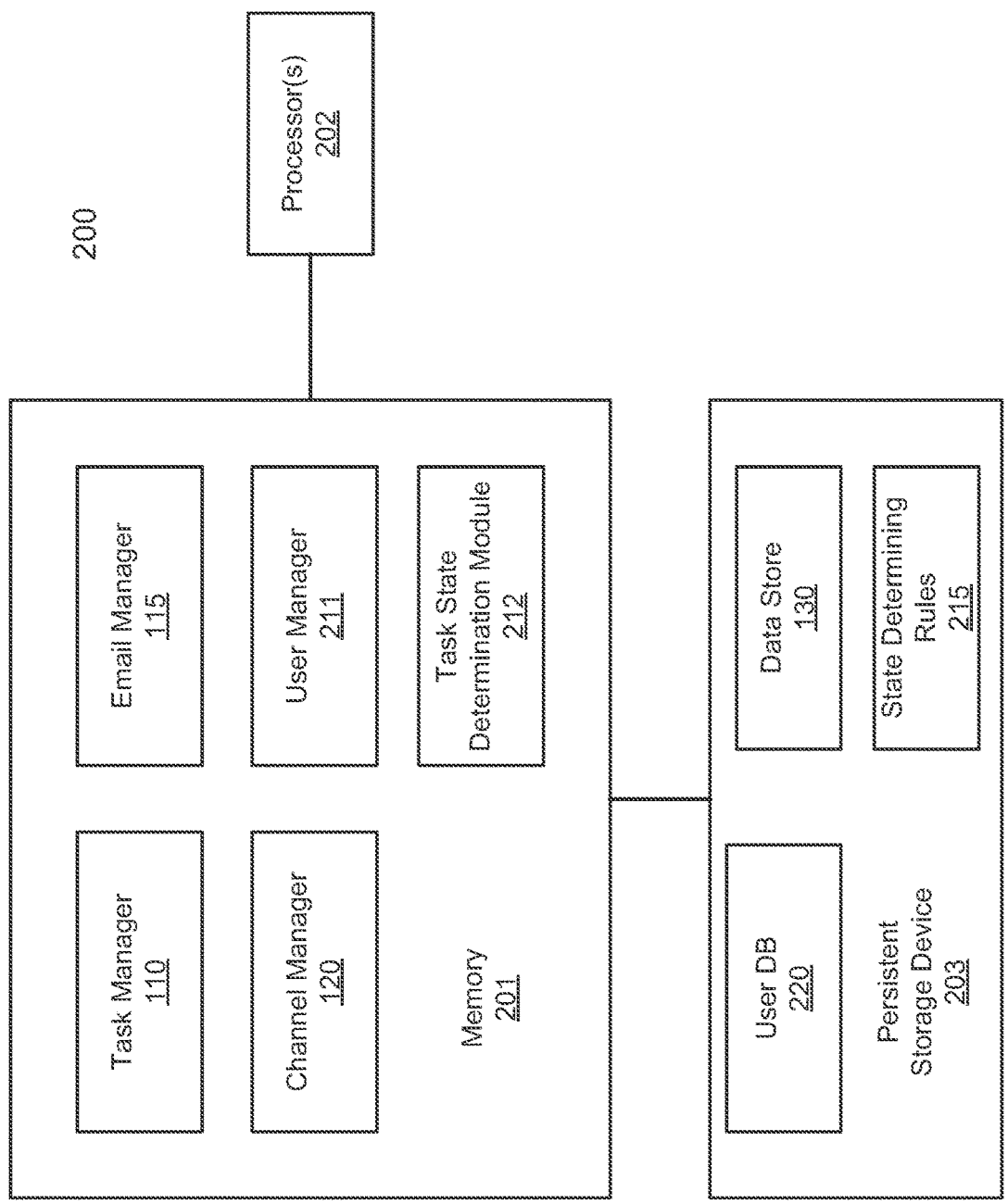
FIG. 2 is a block diagram illustrating an example of a project management system according to one embodiment of the invention.

FIG. 2 is a block diagram illustrating an example of a project management system according to one embodiment of the invention. System 200 may be implemented as part of project management system or server 104. Referring to FIG. 2, system 200 includes project manager 110, email manager 115, channel manager 120, user manager 211, and task state determination module 212 (also referred to as a risk detector). These components or modules can be implemented in software, hardware, or a combination thereof. Some of these components or modules may be integrated into fewer integrated components or modules. For example, these components or modules can be loaded in memory 201 (e.g., volatile memory such as random access memory or RAM) and executed by one or more processors 202 (e.g., microprocessors, central processing units or CPUs). Data store 130 is stored in persistent storage device 203, such as a hard disk, which may be maintained locally or remotely over a network. At least a portion of data stored in data store 130 may be cached in memory 201.

As described above, project manager 110 is configured to communicate and interact with CRM system 105 to obtain project information of projects maintained in CRM system 105. Project manager 110 can communicate with CRM system 105 via an application programming interface (API) and/or using a communication protocol. For a given user, project manager 110 can communicate with CRM system 105 to retrieve a list of projects that are associated with the user. The user can be an owner of a project, a team member of a team managing the project, or a manager of owners or teams of projects. For a given project, project manager 110 can also obtain properties or attributes of the project from CRM system 105 as a part of project information. Project manager 110 is configured to communicate with CRM system(s) 105 using a variety of APIs or protocols compatible with CRM system(s) 105.

For a given project associated with a user, email manager 115 is configured to communicate with email system 106 to identify and obtain a list of emails and/or calendar events associated with the user and the project. Email manager 115 can search via an API based on a user ID of the user (e.g., as a sender or recipient of emails, a participant of meetings) and project keywords (e.g., subject or title field) of the project to identify the relevant emails and calendar events.

For each of the projects maintained in CRM system 105, an IM channel (e.g., IM group chat) is created to allow users associated with the project to exchange messages concerning the project from each other. Channel manager 120 is configured to communicate with IM system 107 via an API to retrieve IM messages of a particular IM channel of a particular project. Channel manager 120 can further derive IM channel statistics of the IM channel based on the IM messages obtained from IM system 107.

Figure 4:
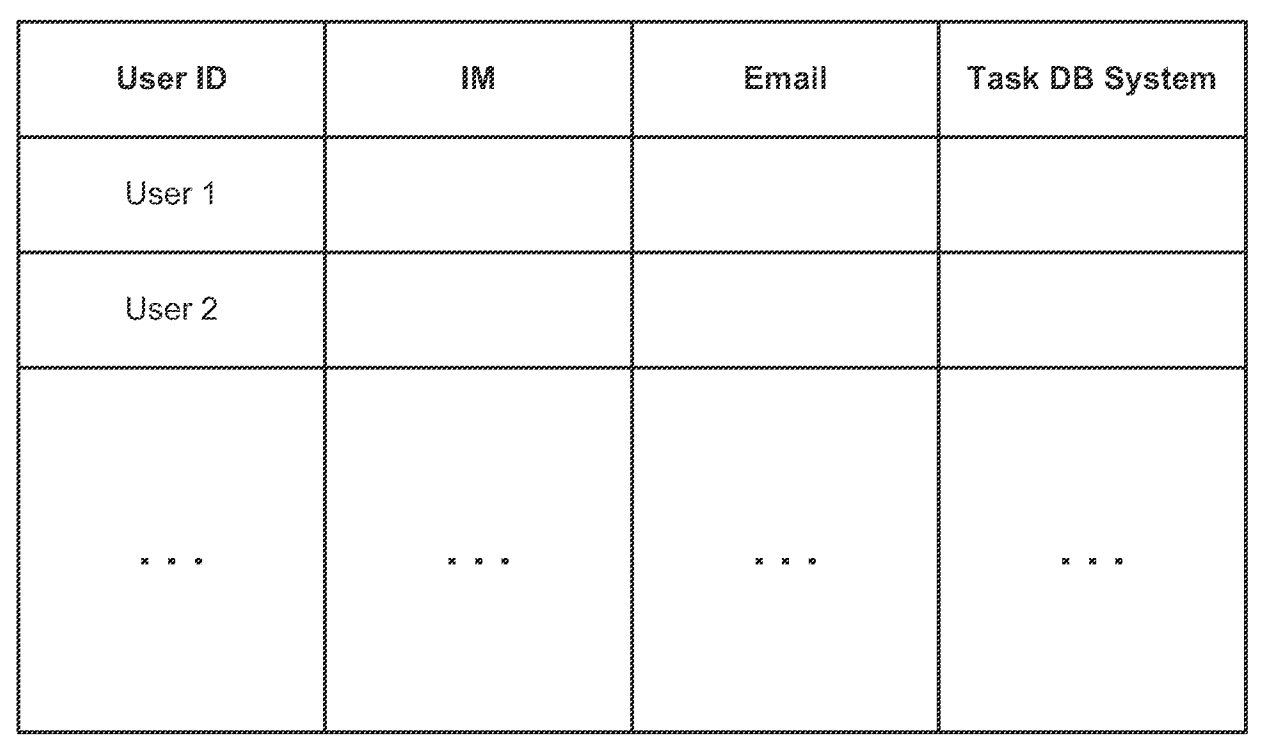

In order to search and find a project that is associated with a user, the user has to register its user identifier (ID), IM address(es), email address(es), and a CRM system associated with the user. The user can register or configure such information via a configuration interface hosted by system 200 (not shown) and the registration information can be stored and maintained in user database 220. An example of user database 220 is shown in FIG. 4 according to one embodiment. The registered IM and email addresses can be utilized to communicate with the user, such as, for example, for notification of projects at risk. User database 220 may further store user login credentials (e.g., usernames, passwords) of users to allow the system to automatically log into the email/calendar systems, the IM systems, and the CRM systems on behalf of the users to obtain necessary project information, IM channel information, and email/calendar event information, without user intervention of the users.

Figure 3:
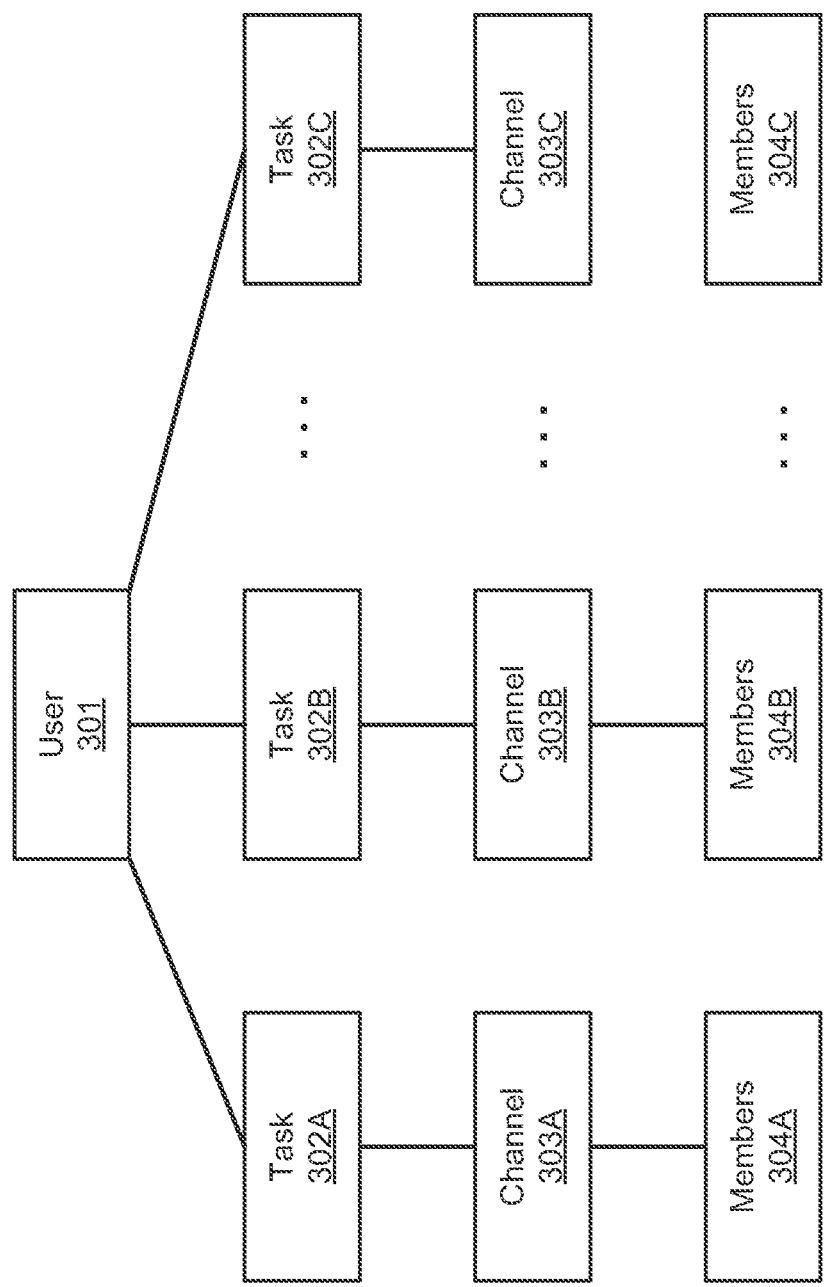
FIG. 3 is a block diagram illustrating an architecture of projects according to one embodiment of the invention.

A user can be associated with one or more projects and each project is associated with a communication channel to allow members of the communication channel to discuss the corresponding project as shown in FIG. 3. Referring to FIG. 3, user 301 may be associated with one or more projects 302A-302C. For example, user 301 may be an individual sales or customer representative working on projects 302A-

302C concurrently. Alternatively, user 301 may be a manager or group leader of a team or group of individual users working on projects 302A-302C. Each of projects 302A-302C may be associated with the same or different enterprise clients (e.g., corporate clients). Each of projects 302A-302C is associated with a communication channel such as communication channels 303A-303C respectively. Each of channels 303A-303C can have one or more members such as members 304A-304C. A user can be automatically added to any of communication channels 303A-303C and can also be automatically removed from any of communication channels 303A-303C under certain circumstances.

Referring now to FIGS. 1A-1B and 2, according to one embodiment of the invention, user manager 211 determines a list of users that have registered with the system based on information obtained from user database 220. For each of the identified users, project manager 110 queries CRM system 105 obtain a list of projects that are associated with the user. CRM system 105 may be a CRM system associated with or utilized by an Enterprise client that the user is working with as a customer representative or sales representative.

In one embodiment, when project manager 110 queries CRM system 105, it sends a query request to CRM system 105, where the query request includes certain parameters to specify the user and an attribute having a particular attribute value. In response, CRM system 105 searches based on the query request to identify and retrieve the list of projects that satisfy the query request. Alternatively, project manager 110 may perform filtering of projects to identify the subset of projects that are associated with a particular user.

Alternatively, for each of the projects found in CRM system 105, channel manager 120 identifies an IM channel that has been created specifically for the project. Channel manager 120 or project manager 110 may maintain a mapping table having a number of mapping entries (not shown). Each mapping entry maps a project ID identifying a project to an IM channel ID identifying an IM channel. Alternatively, the IM channel ID may be stored as a part of project attributes of a project stored in CRM system 105. Alternatively, a project ID of the project may be stored as a part of channel attributes maintained in IM system 107. Channel manager 120 communicates with IM system 107 to determine whether a particular user is a member of the IM channel of the project. If that particular user is a member of the IM channel of the project, the project is considered to be associated with or relevant to the user. Note that throughout this application, an IM system is utilized as an example of a communication system. Other types of communication mechanisms (e.g., social network community) may also be applied.

According to one embodiment, for each user identified by user manager 211, channel manager 120 queries IM system 107 to search and find all the IM channels of which the user is a member. Channel manager 120 also retrieves channel information of each IM channel including, but is not limited to, all members of the IM channel and the recent activities of the IM channel. For example, for a given IM channel, channel manager 120 may determine the date of the last message posted by a member of the channel, a period of time (e.g., a number of days) since the last message was posted by a member, the last time a risk of a project associated with the IM channel was identified and notified, a period of time (e.g., a number of days) since the last risk of the associated project was identified and notified, and/or whether there are any members in the channel other than the owner of the associated project. An owner of a project refers to a lead person or project leader in charge with the development of project, while a team member is someone who works on the project under the leadership or supervision of the owner.

According to one embodiment, for each IM channel of which a user is a member, project manager 110 accesses CRM system 105 to search and identify a project associated with the IM channel and the user. For example, if the user is an owner of a project, that project will be considered to be associated with the user. If the user is the earliest member of an IM channel and is still active, and the owner of a project is not a member of the IM channel, the project will be considered to be associated with the user. In other words, if the user is not the earliest member added to the IM channel and the owner of the project is not a member of the IM channel, that particular project is considered as relevant to the that earliest member of the IM channel. The earliest member of an IM channel refers to the earliest overall member that was chronologically added to the IM channel and he/she is still a member to remain active.

Note that this process is repeatedly performed for each of the users that have registered with the system. If the current user is not the earliest member added to the IM channel and the user is not an owner of the corresponding project, the corresponding project will not be selected to be associated with the current user. However, in another iteration of the process performed for the earliest member of the IM channel, the project may be selected to be associated with that particular earliest member. This project identifying process ensures that the same project is not scanned and selected twice.

In addition, project manager 110 retrieves certain project information of a project from CRM system 105. In one embodiment, some of the project information may be determined dynamically in real-time. For example, a period of time since the last meeting was conducted may be determined in real-time based on the time stamp of the corresponding calendar event and the current system time. The project information of a project includes, but is not limited to, a complete date of the project, a period of time (e.g., a number of days) to the complete date, whether the project is expected to be completed in a future predetermined period of time (e.g., current fiscal month, quarter, or year), the date of the project was last updated, and/or a period of time (e.g., days) since the last update.

According to one embodiment, for a given project and a given user, email manager 115 is configured to access email server 106 to obtain a list of emails and calendar events that are associated with the project and the user. Email manager 115 may search emails and calendar events based on a user ID of the user (e.g., an email address as a sender or a recipient) and one or more keywords of the project (e.g., title, subject field). In addition, email manager 115 retrieves and determines certain email/calendar information concerning the project. The email/calendar information may include, but is not limited to, whether there were any meetings occurred in the past with the relevant parties (e.g., customers) associated with the project, whether there was a meeting conducted in the past, the most recent meeting and a period of time (e.g., days) since the most recent meeting, and/or whether there is a future meeting scheduled for the project.

The above collected project information, channel information, and email/calendar information collectively represent the activities of the corresponding project. Such activity information may provide a hint indicating whether the development of the project is making insufficient progress that may lead to a failure of completing the project. Based on the project information, channel information, and email/ calendar information, according to one embodiment, task state determination module 212 is configure to detect whether a particular project is at risk of failure to complete, for example, due to lack of activities or progress. The task state determination module 212 may determine whether a project is at risk by satisfying a predetermined condition based on the project information, channel information, and email/calendar information according a set of risk determining rules 215. Rules 215 may be user configurable based on the specific requirements of enterprise entities. Each enterprise client may have a different set of rules governing whether a particular project is at risk.

If it is determined that a project is at risk as satisfying a predetermined condition set forth in rules 215, a notification may be sent to a preconfigured destination (e.g., owner of the project, a manager). Any user can be a member of one or more channels of one or more projects. Thus, any user may receive more than one notification identifying one or more projects at risk. These projects at risk can be grouped by type and a single message may be generated with a list of projects at risk. The messages can be sent to a user via user's private communication channel (e.g., IM, email), corporate channel, etc.

Figure 5:
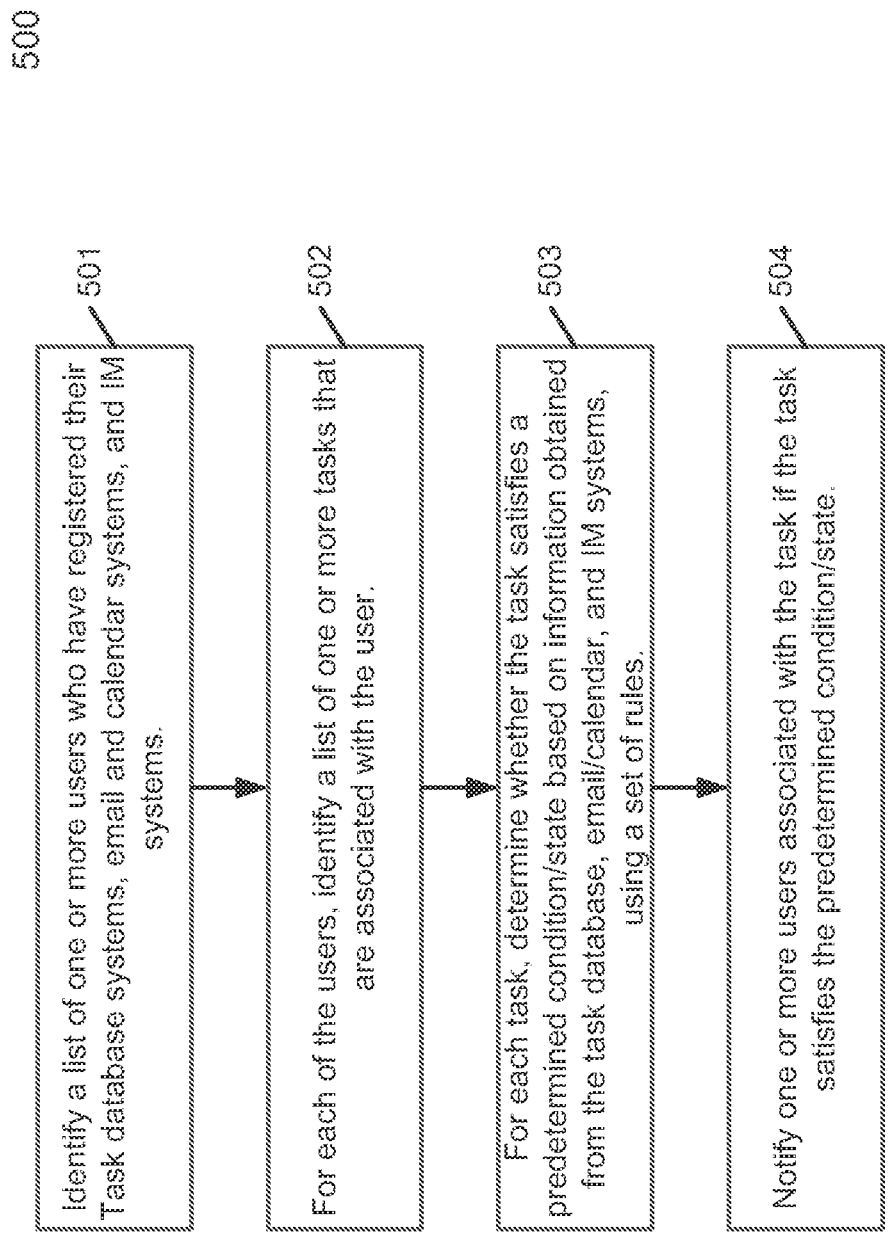
FIG. 5 is a flow diagram illustrating a process of determining status of projects according to one embodiment.

FIG. 5 is a flow diagram illustrating a process of determining status of projects according to one embodiment. Process 500 may be performed by processing logic which may include software, hardware, or a combination thereof. For example, process 500 may be performed by system 200 of FIG. 2. Referring to FIG. 5, in operation 501, processing logic identifies a list of one or more users who have registered their CRM systems (e.g., task database), email addresses, and IM systems. Such registration information may be stored in user database 220. In operation 502, for each of the users, processing logic identifies a list of one or more projects or tasks that are associated with the user. For example, if a project whose IM channel includes the user as a member, the project is considered to be associated with the user. If a user is an owner of a project, the user is associated with the project. If a user is included in an email (e.g., as a sender or recipient) associated with a project, the user may be considered to be associated with the project. In operation 503, for each of the projects associated with the user, processing logic determine whether the project satisfies a predetermined condition or state (e.g., at risk as of inactive or lack of future meetings) based on the project information obtained from a CRM system, email/calendar information obtained from an email server, and channel information obtained from an IM system, using a set of rules such as task state determination rules 215. In operation 504, if a project is determined satisfying a predetermined condition, processing logic transmits a notification to a preconfigured destination.

Figure 6:
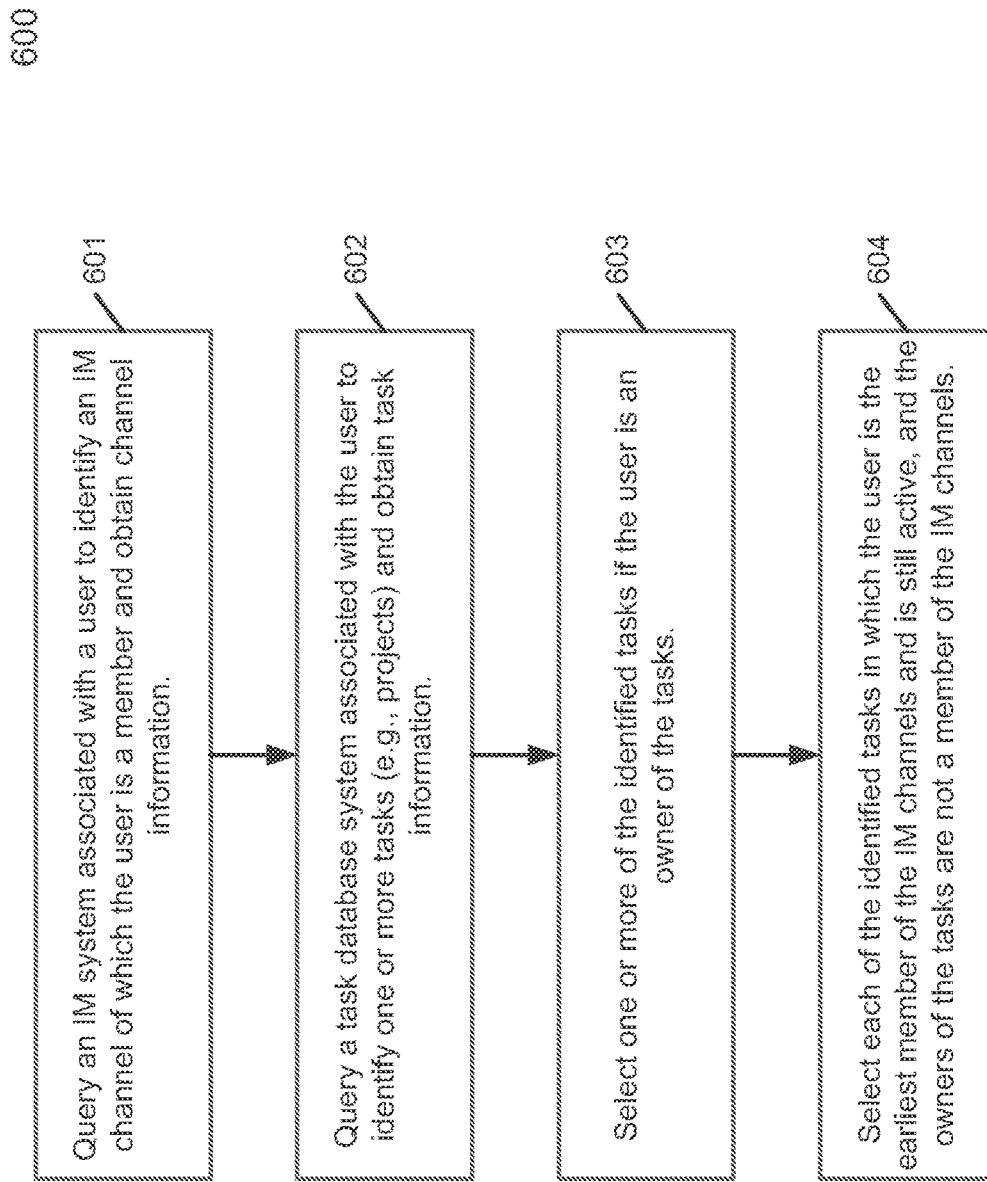
FIG. 6 is a flow diagram illustrating a process of identifying projects associated with a user according to one embodiment.

FIG. 6 is a flow diagram illustrating a process of identifying projects associated with a user according to one embodiment. Process 600 may be performed as a part of operation 502 of FIG. 2. Referring to FIG. 6, in operation 601, processing logic queries an IM system associated with a project/task or a user to identify an IM channel of which the user is a member and obtain channel information of the IM channel (e.g., activities). In operation 602, processing logic queries a CRM system to identify one or more projects and obtain project information of the projects. In operation 603, a project/task is selected from the identified projects if the user is an owner of the selected project. In operation 604, a project/task is selected from the identified projects if the first member of a corresponding IM channel is still active and an owner of the selected project is not a member of the IM channel. The first member of an IM channel refers to the first overall member added to the IM channel.

Figure 7:
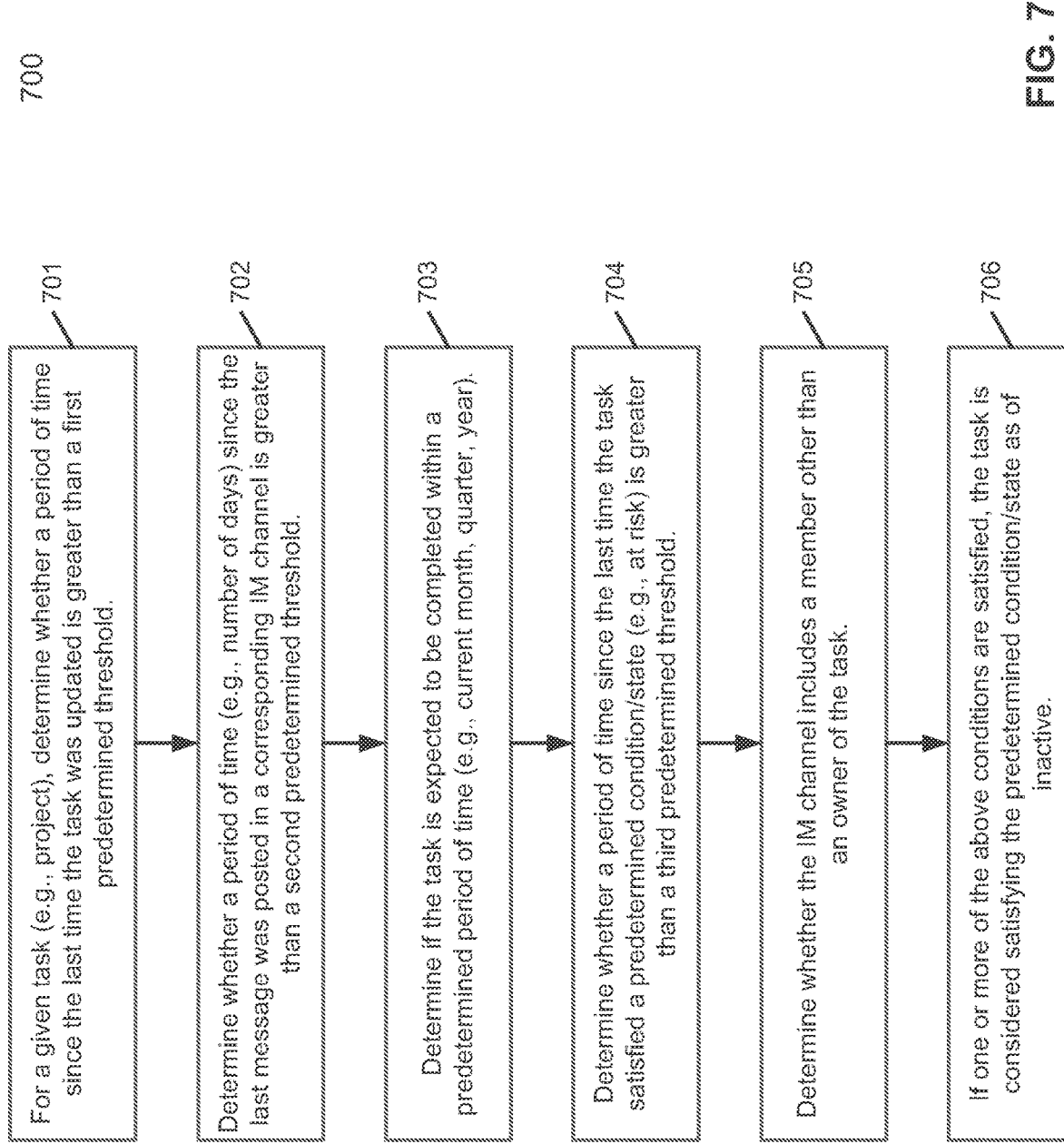
FIG. 7 is a flow diagram illustrating a process of determining whether a project satisfies a condition according to one embodiment.

FIG. 7 is a flow diagram illustrating a process of determining whether a project satisfies a condition according to one embodiment. Process 700 may be performed as a part of operation 503 of FIG. 5 according to a set of risk determining rules 215. Referring to FIG. 7, in operation 701, for a given project, processing logic determines whether a period of time (e.g., number of days) since the last time the project was updated is greater than a first predetermined threshold. Whether a project/task has been updated can be determined based on project information obtained from CRM system 105. In operation 702, processing logic determines whether a period of time (e.g., number of days) since the last message was posted in an IM channel associated with the project/task is greater than a second predetermined threshold. Such a determination can be performed based on the IM channel information obtained from the IM system.

In operation 703, processing logic determines whether the project/task is expected to be completed in a predetermined period of time (e.g., current month, quarter, or year). In operation 704, processing logic determines whether a period of time (e.g., number of days) since the last time the project/task satisfied a predetermined condition/state (e.g., categorized as at risk) is greater than a third predetermined threshold. In operation 705, processing logic optionally determines whether the IM channel associated with the project/task includes a member other than an owner of the project. The rationale behind this is that the owner of the project will already be aware of the situation concerning the project (e.g., no future meeting has been scheduled) since the owner is supposed to be actively thinking and working on the project/task. As a result, one may not want to notify something that the owner might already be aware of. In operation 706, if any one or more of the above conditions set forth in operations 701-705 are satisfied, the project/task is considered at risk as inactive, and an action should be performed or an attention should be brought to someone. In one embodiment, only if all of the conditions set forth in operations 701-705 are satisfied, the corresponding project/task is considered at risk.

Figure 8:
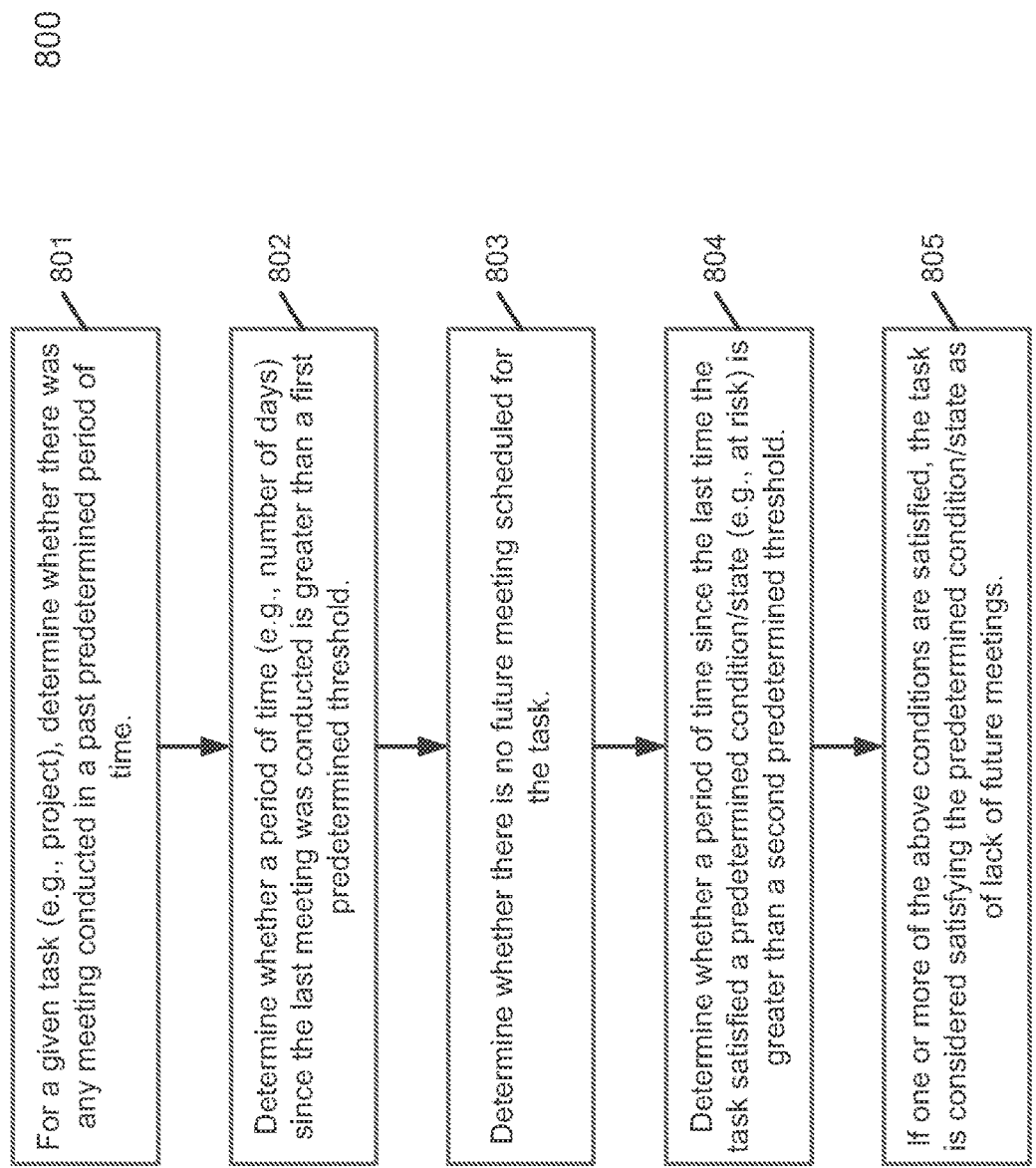
FIG. 8 is a flow diagram illustrating a process of determining whether a project satisfies a condition according to another embodiment.

FIG. 8 is a flow diagram illustrating a process of determining whether a project/task satisfies a condition according to another embodiment. Process 800 may be performed as a part of operation 503 of FIG. 5 according to a set of state/risk determining rules 215. Referring to FIG. 8, for a given project/task, in operation 801, processing logic determines whether there was any meeting scheduled and conducted in a past predetermined period of time. In operation 802, processing logic determines whether a period of time (e.g., number of days) since the last meeting was conducted is greater than a first predetermined threshold. In operation 803, processing logic determines whether there is no meeting that has been scheduled in a future predetermined period of time. In operation 804, processing logic determines whether a period of time (e.g., number of days) since the last time the project was considered at risk by satisfying a predetermined condition/state is greater than a second predetermined threshold. In operation 805, if one or more of the above conditions set forth in operations 801-804 are satisfied, the project/task may be considered at risk as of lack of future meetings. In one embodiment, only if all of the conditions set forth in operations 801-804 are satisfied, the corresponding project/task is considered at risk. A new follow-up meeting may be needed soon.

Note that the above processes may be automatically and periodically performed (e.g., a thread executed in the background or as a maintenance routine in the system) for each of the users in the system, for example, without user intervention of the users. The above predetermined thresholds may be the same or different dependent upon the specific configurations required by the enterprise clients.

Note that some or all of the components as shown and described above (e.g., task manager 110, email manager 115, channel manager 120, user manager 211, and/or task state determination module 212 of FIGS. 1A-1B and 2) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 9:
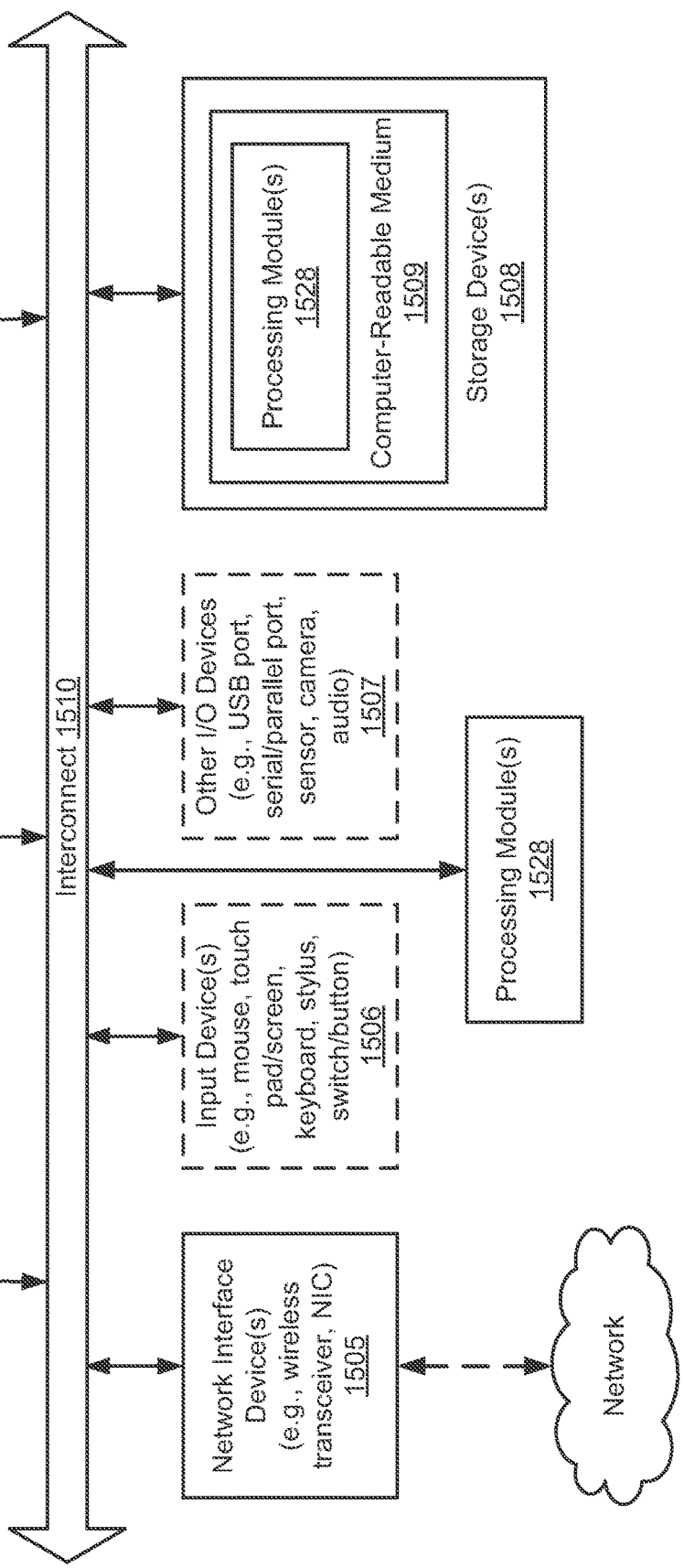
FIG. 9 is a block diagram illustrating a data processing system according to one embodiment.

FIG. 9 is a block diagram illustrating an example of a data processing system which may be used with one embodiment of the invention. For example, system 1500 may represent any of data processing systems described above performing any of the processes or methods described above, such as, for example, a client device or a server described above, such as, for example, clients 101-102 and servers 104-107 of FIGS. 1A-1B, as described above.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google Linux Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, a gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, task manager 110, email manager 115, channel manager 120, user manager 211, and/or task state determination module 212 of FIGS. 1A-1B and 2, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method of generating alerts based on conditions of tasks in a database system, the computer-implemented method comprising:
   querying, at a server via a first application programming interface (API), a task database system associated with a user identifier (ID) identifying a user to retrieve task data of a list of one or more tasks associated with the user ID;
   for each of the tasks associated with the user ID,
      determining a plurality of information sources associated with the user ID, including an email server and an instant messaging (IM) server,
      retrieving, from a user database, login credentials for each of the plurality of information sources based on the user ID,
      for each of the plurality of information sources, logging into the information source using the retrieved login credentials to retrieve activity data from the information source, including
         querying the email server associated with the user ID via a second API to obtain email and calendar activities that include one or more emails and one or more calendar events associated with the task,
         querying the IM server associated with the user ID via a third API to identify IM channel information that identifies one or more IM channels, each IM channel associated with the user ID that identifies the user as a member of the IM channel,
         identifying an IM channel from the one or more IM channels, wherein the identified IM channel was created to exchange messages concerning the task amongst members of the identified IM channel, and
         obtaining IM messages from the identified IM channel, each IM message posted during a first predetermined period of time in past;
      determining based on a set of rules whether the task satisfies a predetermined condition in view of the task data, the activity data, and the IM channel information, the predetermined condition representing risk of failure to complete, wherein determining that the task satisfies the predetermined condition includes at least one of following:
         determining whether there was a meeting associated with the task conducted in a second predetermined period of time in the past based on timestamps of the one or more calendar events,
         determining whether a number of days since a last meeting of the task was conducted is greater than a first predetermined threshold based on the timestamps of the one or more calendar events, or
         determining that the task lacks future meetings, when there was a meeting associated with the task conducted in the second predetermined period of time and the number of days since the last meeting of the task was conducted is greater than the first predetermined threshold; and
      in response to determining that the task satisfies the predetermined condition, generating a message indicating the task satisfies the predetermined condition;
   classifying the tasks into a plurality of groups based on the predetermined conditions that the tasks satisfy, each group associated with one of the predetermined conditions;
   generating a notification message for each of the plurality of groups, the notification message describing the predetermined condition associated with the group; and
   transmitting the notification message for each group to a predetermined destination over a network.

2. The computer-implemented method of claim 1, wherein determining whether the task satisfies a predetermined condition in view of the task data, the activity data, and the 1M channel comprises:
   determining whether a number of days since last time the task was updated is greater than the first predetermined threshold based on the task data; and
   indicating that the task satisfies the predetermined condition as inactive, when the number of days since last time the task was updated is greater than the first predetermined threshold.

3. The computer-implemented method of claim 1, wherein determining whether the task satisfies a predetermined condition in view of the task data, the activity data, and the IM channel comprises:
   determining whether a number of days since a last message was posted in an IM channel associated with the task is greater than a second predetermined threshold based on timestamps of the IM messages; and
   indicating that the task satisfies the predetermined condition as inactive, when the number of days since the last message was posted in an IM channel associated with the task is greater than the second predetermined threshold.

4. The computer-implemented method of claim 3, further comprising determining whether the IM channel associated with the task includes a member other than an owner of the task, wherein the task is categorized as inactive when the IM channel includes a member other than an owner of the task.

5. The computer-implemented method of claim 1, further comprising:
   determining whether the task expects to be completed within a third predetermined period of time based on the task data; and
   indicating that the task satisfies the predetermined condition as inactive, when the task expects to be completed within the third predetermined period of time.

6. The computer-implemented method of claim 1, further comprising:
   determining whether a number of days since last time the task satisfied the predetermined condition is greater than a fourth predetermined threshold; and
   indicating that the task satisfies the predetermined condition as inactive, when the number of days since last time the task satisfied the predetermined condition is greater than the fourth predetermined threshold.

7. The computer-implemented method of claim 1, further comprising:
   determining whether there is a meeting that has been scheduled in a fifth predetermined period of time; and indicating that the task satisfies the predetermined condition as lack of future meetings, when there is no meeting scheduled in the fifth predetermined period of time.

8. The computer-implemented method of claim 1, further comprising:
determining whether a number of days since last time the task satisfied the predetermined condition is greater than a sixth predetermined threshold; and
indicating that the task satisfies the predetermined condition as lack of future meetings, when the number of days since last time the task satisfied the predetermined condition is greater than the sixth predetermined threshold.

9. The computer-implemented method of claim 1, wherein the user database includes a plurality of user entries, each entry mapping a particular user ID to a set of login credentials for accessing a set of information sources associated with that particular user ID.

10. The computer-implemented method of claim 1, wherein the one or more emails are identified based on an email address associated with a sender or a recipient of the one or more emails and one or more keywords in a subject field of each of the one or more emails.

11. The computer-implemented method of claim 1, wherein the task is determined to be associated with the user when the task includes one IM channel with the user as a member.

12. The computer-implemented method of claim 1, wherein querying a task database system associated with a user ID comprises selecting a task to be relevant to the user when the user is an owner of the task.

13. The computer-implemented method of claim 1, wherein retrieving the task data of the list of one or more tasks associated with the user comprises selecting a task to be relevant to the user when the user is a member of an instant messaging (IM) channel associated with the task and the user is active.

14. The computer-implemented method of claim 1, wherein the second predetermined period of time is shorter than the first predetermined period of time.

15. A non-transitory machine-readable medium having instructions stored therein, which when executed by a processor, cause the processor to perform operations, the operations comprising:
querying, via a first application programming interface (API), a task database system associated with a user identifier (ID) identifying a user to retrieve task data of a list of one or more tasks associated with the user ID;
for each of the tasks associated with the user ID,
determining a plurality of information sources associated with the user ID, including an email server and an instant messaging (IM) server,
retrieving, from a user database, login credentials for each of the plurality of information sources based on the user ID,
for each of the plurality of information sources, logging into the information source using the retrieved login credentials to retrieve activity data from the information source, including
querying the email server associated with the user ID via a second API to obtain email and calendar activities that include one or more emails and one or more calendar events associated with the task,
querying the IM server associated with the user ID via a third API to identify IM channel information that identifies one or more IM channels, each IM channel associated with the user ID that identifies the user as a member of the IM channel,
identifying an IM channel from the one or more IM channels, wherein the identified IM channel was created to exchange messages concerning the task amongst members of the identified IM channel, and
obtaining IM messages from the identified IM channel, each IM message posted during a first predetermined period of time in past;
determining based on a set of rules whether the task satisfies a predetermined condition in view of the task data, the activity data, and the IM channel information, the predetermined condition representing risk of failure to complete, wherein determining that the task satisfies the predetermined condition includes at least one of following:
determining whether there was a meeting associated with the task conducted in a second predetermined period of time in the past based on timestamps of the one or more calendar events,
determining whether a number of days since a last meeting of the task was conducted is greater than a first predetermined threshold based on the timestamps of the one or more calendar events, or
determining that the task lacks future meetings, when there was a meeting associated with the task conducted in the second predetermined period of time and the number of days since the last meeting of the task was conducted is greater than the first predetermined threshold; and
in response to determining that the task satisfies the predetermined condition, generating a message indicating the task satisfies the predetermined condition;
classifying the tasks into a plurality of groups based on the predetermined conditions that the tasks satisfy, each group associated with one of the predetermined conditions;
generating a notification message for each of the plurality of groups, the notification message describing the predetermined condition associated with the group; and
transmitting the notification message for each group to a predetermined destination over a network.

16. The non-transitory machine-readable medium of claim 15, wherein determining whether the task satisfies a predetermined condition in view of the task data, the activity data, and the IM channel comprises:
determining whether a number of days since last time the task was updated is greater than the first predetermined threshold based on the task data; and
indicating that the task satisfies the predetermined condition as inactive, when the number of days since last time the task was updated is greater than the first predetermined threshold.

17. The non-transitory machine-readable medium of claim 15, wherein determining whether the task satisfies a predetermined condition in view of the task data, the activity data, and the IM channel comprises:
determining whether a number of days since a last message was posted in an IM channel associated with the task is greater than a second predetermined threshold based on timestamps of the IM messages; and
indicating that the task satisfies the predetermined condition as inactive, when the number of days since the last message was posted in an IM channel associated with the task is greater than the second predetermined threshold.

18. The non-transitory machine-readable medium of claim 17, wherein the operations further comprise determining whether the IM channel associated with the task includes a member other than an owner of the task, wherein the task is categorized as inactive when the IM channel includes a member other than an owner of the task.

19. The machine-readable medium of claim 15, wherein the operations further comprise:
  determining whether the task expects to be completed within a third predetermined period of time based on the task data; and
  indicating that the task satisfies the predetermined condition as inactive, when the task expects to be completed within the third predetermined period of time.

20. A data processing system, comprising:
  a processor; and
  a memory coupled to the processor to store instructions, which when executed by the processor, cause the processor to perform operations, the operations comprising:
    querying, via a first application programming interface (API), a task database system associated with a user identifier (ID) identifying a user to retrieve task data of a list of one or more tasks associated with the user ID;
    for each of the tasks associated with the user ID,
      determining a plurality of information sources associated with the user ID,
        including an email server and an instant messaging (IM) server, retrieving, from a user database, login credentials for each of the plurality of information sources based on the user ID,
      for each of the plurality of information sources, logging into the information source using the retrieved login credentials to retrieve activity data from the information source, including querying the email server associated with the user ID via a second API to obtain email and calendar activities that include one or more emails and one or more calendar events associated with the task,
        querying the IM server associated with the user ID via a third API to identify IM channel information that identifies one or more IM channels, each IM channel associated with the user ID that identifies the user as a member of the IM channel,
        identifying an IM channel from the one or more IM channels, wherein the identified IM channel was created to exchange messages concerning the task amongst members of the identified IM channel, and
        obtaining IM messages from the identified IM channel, each IM message posted during a first predetermined period of time in past;
      determining based on a set of rules whether the task satisfies a predetermined condition in view of the task data, the activity data, and the IM channel information, the predetermined condition representing risk of failure to complete, wherein determining that the task satisfies the predetermined condition includes at least one of following:
        determining whether there was a meeting associated with the task conducted in a second predetermined period of time in the past based on timestamps of the one or more calendar events,
        determining whether a number of days since a last meeting of the task was conducted is greater than a first predetermined threshold based on the timestamps of the one or more calendar events, or
        determining that the task lacks future meetings, when there was a meeting associated with the task conducted in the second predetermined period of time and the number of days since the last meeting of the task was conducted is greater than the first predetermined threshold; and
      in response to determining that the task satisfies the predetermined condition, generating a message indicating the task satisfies the predetermined condition;
  classifying the tasks into a plurality of groups based on the predetermined conditions that the tasks satisfy, each group associated with one of the predetermined conditions;
  generating a notification message for each of the plurality of groups, the notification message describing the predetermined condition associated with the group; and
  transmitting the notification message for each group to a predetermined destination over a network.

* * * * *